United States Patent [19]
Brajovic

[11] Patent Number: 5,699,278
[45] Date of Patent: Dec. 16, 1997

[54] FOCAL PLANE PROCESSOR

[76] Inventor: Vladimir M. Brajovic, 727 Gallion Ave., Pittsburgh, Pa. 15226

[21] Appl. No.: 377,177

[22] Filed: Jan. 24, 1995

[51] Int. Cl.$^6$ .................................................. G06F 19/00
[52] U.S. Cl. ........................ 364/525; 364/807; 382/308
[58] Field of Search ........................ 364/525, 131–133, 364/602, 605, 807, 829, 830; 250/338.1, 370.08, 330, 332, 349, 344, 352; 358/113; 348/164, 242; 395/800; 382/276, 302, 303, 304, 308

[56] References Cited

U.S. PATENT DOCUMENTS

| | | | |
|---|---|---|---|
| 4,786,818 | 11/1988 | Mead et al. | 250/578 |
| 5,062,000 | 10/1991 | Harris et al. | 358/213.27 |
| 5,086,219 | 2/1992 | Koch et al. | 250/208.2 |
| 5,107,103 | 4/1992 | Gruss et al. | 250/208.3 |
| 5,113,365 | 5/1992 | Yang | 364/807 |
| 5,200,623 | 4/1993 | Cannata | 250/338.1 |
| 5,220,398 | 6/1993 | Horn et al. | 356/152 |
| 5,223,754 | 6/1993 | Decker et al. | 307/584 |
| 5,449,907 | 9/1995 | McKeeman et al. | 250/332 |
| 5,459,319 | 10/1995 | Norsworthy | 250/349 |

OTHER PUBLICATIONS

Burgi et al., "Asynchrony in image analysis: using the luminance–to–response–latency relationship to improve segmentation," *J. Opt. Soc. Am. A*, vol. 11, No. 6, Jun. 1994, pp. 1720–1726.

Cormen et al., "Section 9.2.: Counting Sort", *Introduction to Algorithms*, Sixth Printing, 1992, The MIT Press.

Forchheimer et al., "Near–Sensor Image Processing: A New Paradigm", IEEE Trans. On Image Processing, vol. 3, No. 6, Nov. 1994, pp. 736–746.

Astrom et al., "An Integrated Sensor/Processor Architecture Based on Near–Sensor Image Processing", Proceedings of the Workshop on Computer Architecture for Machine Perception, New Orleans, Dec. 15, 1993, pp. 147–154.

Astrom, "Smart Image Sensors", Ph.D. Thesis No. 319, Linkoping University, Sweden, Nov. 1993.

Vladimir Brajovic et al, "Computational Sensors for Global Operations", IUW (ARPA), Nov. 13–16, 1994, pp. 621–630.

Kanade et al. "Computational Sensors", DARPA Workshop U. Penn, May 11–12, 1993, Also in IUW '93.

Ballard & Brown: "Computer Vision", Prentice–Hall, Inc. 1982 Sect. 3.2.2. Histogram Transformations.

(List continued on next page.)

*Primary Examiner*—James P. Trammell

[57] ABSTRACT

A circuit and method for computations on large groups of input operands is disclosed. More specifically, the present invention is related to focal plane processing. The method of the present invention performs parallel data computation exemplified by a low latency global characterization of the input operands and the sorting of the input operands. The circuit of the present invention is comprised of a cellular matrix which is comprised of a plurality of cells upon which the input operands are introduced. All the cells are simultaneously placed into the active state by a reset means. The duration of the active state in each of the cell is determined as a monotonic function of the magnitude of the input operand received by the cell after which the cell enters the idle state. Each cell generates an event for signaling to the outside of the cell at the instant the active state ends and the idle state begins. Any two cells receiving input radiation of different magnitudes generate events at different times. A global processing means receives the events from the cellular matrix and continuously produces a count indicating the number of the cells that are simultaneously in the active state, or alternatively in the idle state. Such a count is a temporal representation providing a detailed description a cumulative histogram of the input operands. With a memory means associated with each of the cells, this count can be sampled and stored at the instant when the associated cell generates the event. Such a stored memory content is an evolving histogram—equalized representation of the input operands and is result of sorting input operands.

17 Claims, 6 Drawing Sheets

OTHER PUBLICATIONS

Ballard & Brown: "Computer Vision", Prentice–Hall, Inc. 1982 Sect. 5.3 Global Techniques: Region Growing via Thresholding.

Blelloch et al. "Comparison of Sorting Algorithms for Connection Machine CM–2", SPAA 1991.

Ishikawa et al. "High Speed Vision System Using Massively Parallel Processing", Proc. IEEE Intl. Conf. Robotics, '92.

Yamada et al. "High Speed Target Tracking Using Massively Parallely Processing Vision", Proc of IEEE Intl. Conf on Rob. '93, pp. 267–272.

Weckler: "Operatoin of P–N Junction Photodetectors in a Photon Flux Integrating Mode", IEEE, vol. SC–2, No. 3, Sep. '67.

FOCAL PLANE PROCESSOR

This invention was made with Government support under grant No. 9305494 awarded by the National Science Foundation. The Government has certain rights in this invention.

FIELD OF THE INVENTION

The present invention relates to a method and device for performing computations on large groups of data. More specifically, the present invention is related to an electronic circuit which is able to sense and process radiation received thereon.

BACKGROUND OF THE INVENTION

A vast number of imaging systems are being employed in various areas: industrial automation and inspection, surveillance and security, home and entertainment, etc. Conventional imaging systems are typically comprised of a camera, communication link, digitizer and processor. The consistent paradigm in these systems has been that a "camera" sees the world and a computer "algorithm" processes the sensory signal (e.g. enhances an image, recognizes an object, etc.) Implicit in this paradigm is that the large groups of transduced data are read out of the sensor and digitized into the computer for processing. The separation of sensing and processing in imaging systems using such read-then-process paradigm has resulted in a number of disadvantages:

(a) Existing imaging systems have high latency. High latency is caused by the time required for readout and transfer of massive amounts of data, as well as by heavy computational loads at the processor end. Latency is different from throughput: latency indicates how long it takes for the system to react to an event; throughput indicates how often the system updates the output. Modem computer architectures and custom image processing hardware combined with vision algorithms have made it possible to increase the throughput of many existing systems to standard video rate (30 frames/sec); nonetheless, processing power is still inadequate for low-latency image processing. Further, as long as a conventional camera with the read-then-process paradigm is used, the minimum latency is still approximately 33 msec (i.e. one frame). For critical applications that must cope with fast events or provide sensory feedback to a human user, it is often too late when the system has "received" the image data.

(b) Sensory data in the read-then-process paradigm are either degraded or completely lost. Transferring data from the camera to the processing hardware (i.e. computer) over various communications channels introduces noise and degrades the sensory data. In addition, processing image hardware principally employing digital electronics requires quantization and digitization of the sensory signal. This process introduces quantization noise. For example, radiation levels which fall within a single quantization level are digitized and represented as a single digital level. Therefore, small and often useful variations detected by the sensors are lost or masked by the quantization noise.

(c) In many applications, scenes to be imaged consist of very bright and very dim regions. In order to successfully image such a scene, an imaging sensor with a large dynamic range is required. However, existing solid-state imagers have limited dynamic range. If such a conventional imager is adjusted for imaging bright regions of the scene, the detail in dark areas is lost since it appears completely black. On the other hand, if the dark regions are successfully imaged, the bright areas saturate the sensor and those regions appear white. This is a serious limitation in many applications. For example, a security camera at the entrance of an apartment building often produces images that consist of a bright background and a dim image of a person in foreground. Using existing image sensors, an observer sees only a silhouette of the person at the door and is unable to observe facial features for a positive recognition. Another example is a scene with shadows: light received from the shadowed areas can be several thousands time smaller then the light received from directly illuminated surfaces. If the camera is adjusted to image features in shadows, the directly illuminated regions will saturate the sensor;

(d) The two-dimensional nature of data captured in an image is not fully exploited since data are read in a serial fashion and most often processed on a serial computer. Therefore, the conventional image processing systems often employ the time consuming process of reconstructing the two-dimensional image in the computer memory or in a multiprocessor computer.

(e) Conventional image systems are large, power-hungry and expensive.

The major shortcomings of the read-then-process approach outlined above, along with the fact that this approach naturally leads to bulkier and less cost-effective systems, suggest that an alternative is needed. A partial solution has been found in Z plane stacked signal processing layers or Z plane structures, particularly for area detector arrays. In the Z plane structures a plurality of devices such as integrated circuits and printed circuit boards are mechanically and electrically connected to the detector array. Yamada et al. in "High Speed Target Tracking Using Massively Parallel Processing Vision", Proceeding of the 1993 IEEE/RSJ International Conference on Intelligent Robots and Systems held in Japan, present one Z plane structure, which employs a plurality of interconnected digital bit-serial processors dedicated to each photodetector in the sensor plane. Solutions based on the Z plane structures are still bulky, expensive, power-hungry and have low spatial resolution.

Another known approach towards solving problems of the conventional vision systems is integrating sensing and processing in a single VLSI integrated circuit. U.S. Pat. No. 4,786,818 to Mead et at. (1988), U.S. Pat. No. 5,223,754 (inclusive U.S. Pat. No. 5,062,000), U.S. Pat. No. 5,086,219 to Koch et al (1992), and U.S. Pat. No. 5,107,103 to Gross et al. (1992) all show examples of focal plane arrays with integrated sensing and processing. Kanade et al. (see "Computational Sensors", Proceeding of Image Understanding Workshop, 1993) have named solutions like these "computational sensors" to emphasize their tightly coupled sensing and processing. It has been noted early on that spatial properties of sensed images can be easily exploited in computational sensors. Consequently almost all known computational sensors implement local operations on images—operations which compute results using only few input operands which are in close physical proximity. These operations are typically represented by spatially invariant filtering with a small kernel. The result of local operations are only preprocessed images which need to be read out from the sensor. The latency incurred during the image readout is often prohibitive in critical real applications.

In contrast to local operations, global operations require the gathering and processing of information over entire set of input data. Communicating efficiently among large number of processors traditionally has been a challenge in parallel systems—parallel digital computers and computational sensors alike. Typical examples of global operations on images are histogramming, sorting, region segmentation/ labeling, etc. Global operations are essential in low-latency systems. In addition to processed images, global operations compute global quantities about the input image. In a computational sensor, some of these global quantities can be reported on a few output pins with very low latency and may be used for fast decision making with image never being readout. These issues are discussed in my paper (coauthored by Takeo Kanade) "Computational Sensors for Global Operations" published in the Proceedings of ARPA Image Understanding Workshop 1994.

One example in prior art, U.S. Pat. No. 5,220,398 to Horn at al. (1993), shows a computational sensor which computes few global image properties: the position and orientation of a single bright object in the field of view. These quantities are easily readout. Nonetheless, the use of this computational sensor is limited: it requires special conditions in the image (e.g. single object in the field of view); it computes such global quantities useful only in some special cases, and; it cannot perform imaging.

In addition to having some or all of the conventional imaging system problems listed above, all computational sensors known so far are highly inflexible. In most cases they are "hard-wired" to perform a single algorithm and cannot be reprogrammed or rewired.

Accordingly, the primary objects and advantage of the present invention is to provide a method and device for use in massively-parallel computational systems which overcome disadvantages of existing approaches. Further objects and advantages will become apparent from a consideration of the ensuing description and drawings.

SUMMARY OF THE INVENTION

The present invention is related to a device and method for computations on large groups of input operands. More specifically, the present invention is related to an electronic circuit which is able to sense and process radiation received thereon. The present invention is comprised of a cellular matrix comprised of plurality of cells upon which radiation is introduced.

Each cell in the matrix has only two states, including an active and idle state. All the cells are simultaneously placed into the active state by a reset means in response to a reset event. A control element in each of the cells determines the duration of the active state as a monotonic function of the magnitude of the input operand received by the cell, and places the cell in the idle state. The control element also generates an event for signaling to the outside of the cell at the instant the cell transitions from the active state to the idle state. Any two cells receiving input radiation of different magnitude generate events at different times. A global processing means receives the events from the cellular matrix and continuously produces a count indicating the number of the cells that are simultaneously in the active state, or, alternatively, in the idle state. Such a count is a temporal representation providing a detailed description of a cumulative histogram of the input operands. With a memory means associated with each of the cells, this count can be sampled and stored at the instant when the associated cell generates the event. Such a stored memory content is an evolving histogram-equalized representation of the input operands.

The present invention performs a low latency global characterization of a plurality of input operands comprising the following steps: the step of introducing the plurality of input operands one-per-cell to the plurality of cells having two states; then, the step of simultaneously resetting all of the cells to the active state with a reset means; then the step of determining with a control means the duration of the active state as a monotonic function of the magnitude of the input operand received by the cells, placing the cell into the idle state and generating an event when the transition from the active state to the idle state occurs; then, the step of communicating the generated events from the plurality of cells to a global processing means as soon as the events are generated; then, the step of producing in response to received events the count indicating the number of cells that are in the active state, or alternatively in the idle state, and thus generating a low latency temporal representation describing a cumulative histogram of the input operands.

By further comprising the step of storing the instantaneous value of said count with a memory means associated with each of the cells at the instant the associated cell generates the event the present invention performs sorting or ordering of a plurality of real input operands in constant time, i.e. the time independent of the number of input operands.

The present invention performs a parallel data computation comprising the following steps: the step of introducing the plurality of input operands one-per-cell to the plurality of cells having two states; then, the step of simultaneously resetting all of the cells to the active state with a reset means; then the step of determining with a control means the duration of the active state as a monotonic function of the magnitude of the input operand received by the cells, placing the cell into the idle state and generating an event when the transition from the active state to the idle state occurs; then, the step of performing at least one operation with a local processing means associated with each of the cells in response to the generated event within the associated cell; then, the step of communicating the generated events from the plurality of cells to a global processing means as soon as the events are generated; then, the step of performing with the global processing means at least one function in response to the received events and as soon as the events are received wherein at least one temporal representation describes the plurality of input operands.

DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
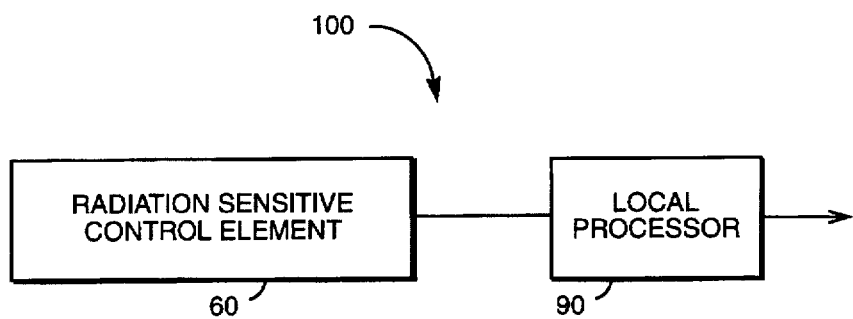
FIG. 1 shows a partial structure of the present invention.

Referring now to the drawings wherein like reference numerals refers to similar or identical parts throughout the several views, and more specifically to FIG. 1 thereof, there is shown a schematic representation of the partial circuit of the present invention 100. The circuit 100 is comprised of a radiation sensitive control element 60. The circuit is also comprised of a local processor 90 which receives a control signal from the radiation sensitive control element 60. The local processor 90 may be in communication with at least another wire for communicating with the outside world.

The operation of the circuit 100 is as follows. The radiation sensitive control element 60 produces a control signal or portions thereof at an instant determined by received radiation. The local processor 90 has at least one predetermined function. The control signal determines instants when the local processor 90 performs its function. If the local processor 90 is capable of performing plurality of functions, then the control signal may determine instants when the local processor 90 switches between its functions.

Figure 2:
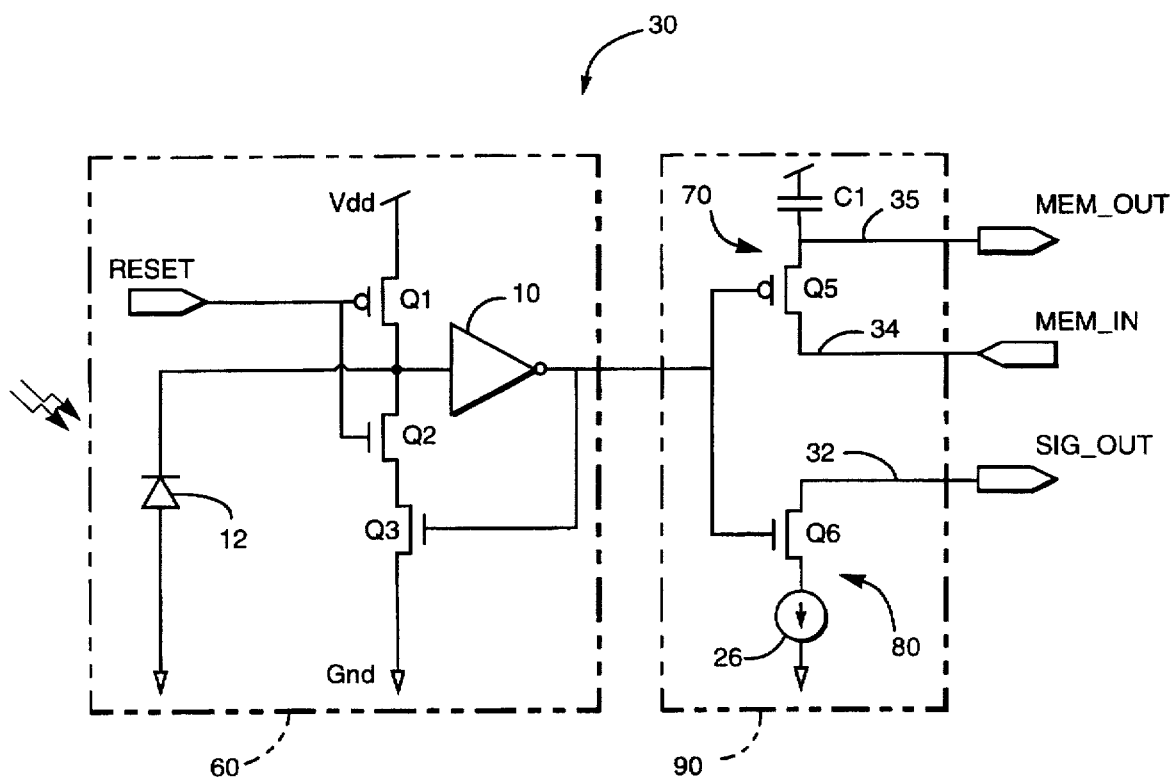
FIG. 2 shows a circuit diagram of one preferred embodiment of the present invention.

FIG. 2 shows a schematic representation of a circuit 30 which is a preferred embodiment of the circuit 100 built in a COS (complementary oxide silicon) technology. In the preferred embodiment the local processor 90 is able to remember a signal and generate another signal. Accordingly, the local processor 90 includes a memory 70 and a signal generator 80 both receiving the control signal from the radiation sensitive control element 60.

The memory 70 may include a memory input wire 34 and a memory output wire 33. The memory 70 may include a track-and-hold (T/H) circuit comprised of a storage capacitor C1 and a complementary switch Q5. In the T/H circuit the memory input wire 34 is connected to the capacitor C1 through the complementary switch Q5; the memory output wire 35 is connected directly to the capacitor C1. Whether the complementary switch Q5 is opened or closed is determined by the control signal from the radiation sensitive control element 60. Therefore, the control signal determines when the T/H circuit "tracks" and when it "holds".

The signal generator 80 can include a current source 26, an output signal wire 32, and a switch Q6. The current source 26 is connected to the output signal wire 32 via the switch Q6. The instants when the current of current source 26 is switched on and off to the output signal wire 32 via the switch Q6 is determined by the control signal from the radiation sensitive control element 60.

In the preferred embodiment, the radiation sensitive control element 60 includes a photodiode 12 which produces a sensor signal corresponding to the radiation it receives. Preferably, the radiation sensitive control element 60 also includes an inverter 10 which receives the sensor signal from the photodiode 12. The radiation sensitive control element 60 also includes a complementary switch Q1. The switch Q1 is connected between the input of the inverter 10 and the positive power supply rail Vdd. Whether the switch Q1 is opened or closed is determined by a second signal RESET. The radiation sensitive control element 60 may also include a switch Q2 and a switch Q3 connected in a series between the input of the inverter 10 and a ground power supply rail Gnd. Whether the switch Q3 is opened or closed is determined by the output of the inverter 10. Similarly, the switch Q2 is managed by the signal RESET. The output of the inverter 10 represents the control signal which is sent to the local processor 90 or, more specifically, to the memory 70 and the signal generator 80 therein.

Figure 5:
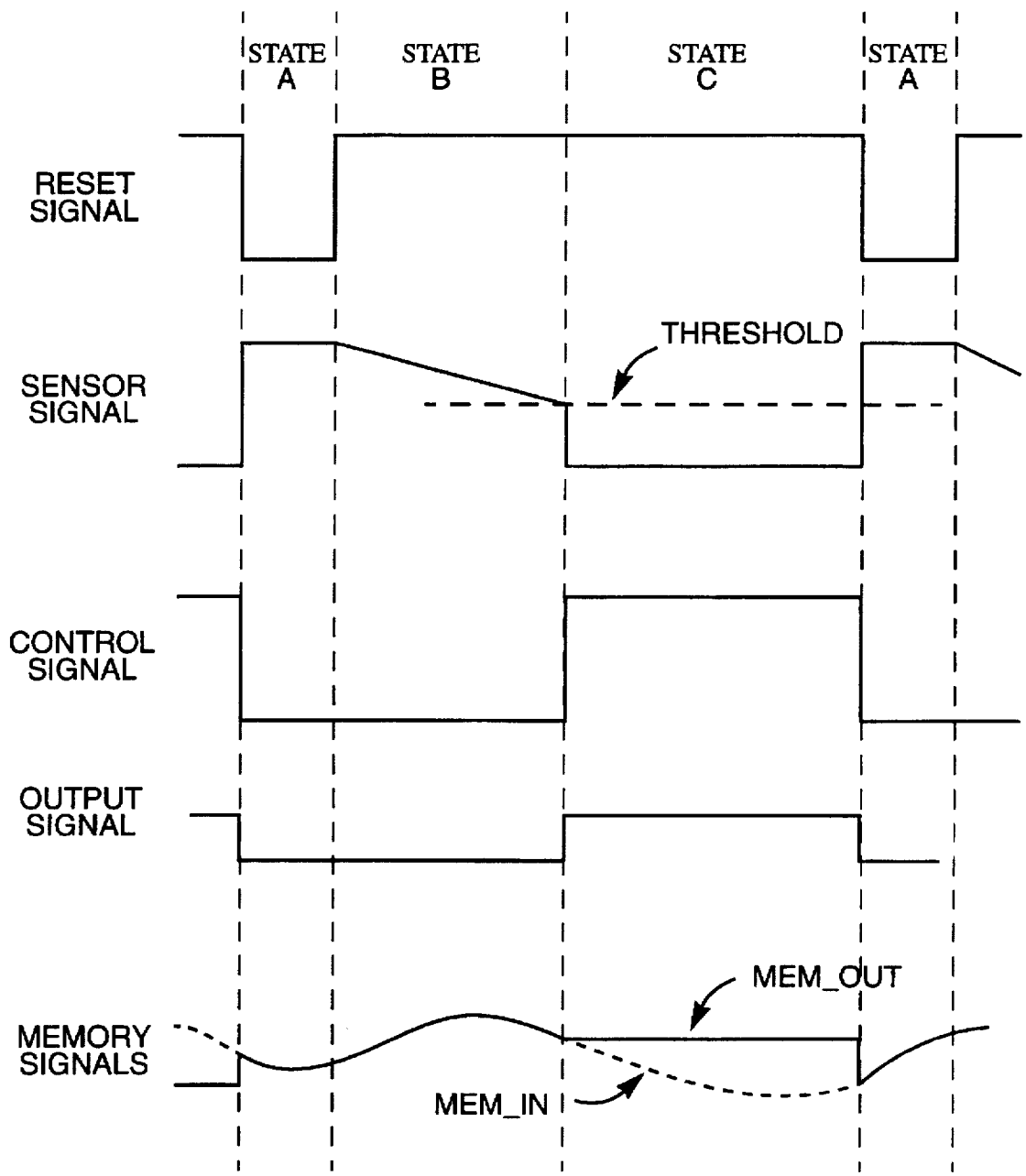
FIG. 5 shows signal waveforms typical for the operation of the preferred embodiment of FIG. 2.

FIG. 5 shows waveforms of representative signals during typical operation of the circuit 30. From top to bottom the diagrams show: (a) the signal RESET; (b) the sensor signal supplied to the input of the inverter 10; (c) the control signal at the output of the radiation sensitive control element 60; (d) an arbitrary signal supplied to the memory input wire 34 (dashed line) and a signal at the memory output wire 35 (solid line); (e) a current signal generated in the output signal wire 32.

Referring now to both FIG. 2 and FIG. 5, the operation of the circuit 30 is as follows. The radiation sensitive control element 60 generates a pulse whose width or duration is determined by the received radiation. More specifically the instant when the control signal undergoes low-to-high transition is determined by radiation incident upon the radiation sensitive control element 60, or more specifically, upon the photodiode 12. The inverter 10 behaves as a comparator with a predetermined built-in threshold level. Namely, for input voltage substantially lower than the threshold, the inverter 10 produces a high voltage output. Similarly, for input voltage substantially higher then the threshold, the inverter 10 produces a low output. When the input to the inverter 10 is approximately at the threshold level, the output of the inverter 10 is going through the transition. In the circuit 30 input signal to the inverter is a voltage from the inversely polarized photodiode 12. Preferably, the inverter 10 does not load the sensor. (Typically, inverters fabricated in COS technology meet this preference.) The photodiode 12 operates in the photon-flux-integrating mode as described by Weckler in "Operation of p-n Junction Photodetectors in a Photon Flux Integration Mode" published in IEEE Journal of Solid State Circuits (1967), included by reference. This mode of operation of the photodiode 12 is also briefly outlined in the continuing description of operation.

When the signal RESET is low, the complementary switch Q1 is closed and the switch Q2 is open. Therefore, the photodiode 12 and the input of the inverter 10 are charged to approximately power supply voltage Vdd, causing the output voltage of the inverter 10 to be at low level. The low signal level at the output of the inverter 10 keeps the switch Q3 open. When the signal RESET goes high, the complementary switch Q1 opens, the switch Q2 closes, but since the switch Q3 is open due to the low output of the inverter 10, the photodiode 12 is left to float. In this state the voltage of the floating photodiode 12 changes primarily due to a photocurrent generated by the incident radiation. The voltage on the photodiode 12 begins to decrease due to the integration of the photocurrent. The rate of this change is approximately proportional to the instantaneous radiant flux incident on the photodiode 12. Once the voltage of the photodiode 12 approaches the threshold of the inverter 10, the inverter's output changes state from low to high. Then, the switch Q3 closes, clamps the input of the inverter 10 to the ground, and forces rapid latching of the inverter's output to the high level. The switch Q3 essentially acts as a positive feedback for the inverter 10. The feedback promotes a fast and precise low-to-high transition at the output of the inverter 10. The time elapsed from the beginning of photocurrent integration (i.e. the raising edge of the signal RESET) to the latching instant is approximately inversely proportional to the average radiant flux incident upon the photodiode 12 during integration, i.e.

$$t_{latch} \cong \frac{k_1}{R_{hv}}$$

where $R_{hv}$ is the average radiant flux incident upon the photodiode 12 during integration; $t_{latch}$ is the instant when the control signal is produced due to the latching of inverter 10, and $k_1$ is a constant related to the power supply voltage Vdd, threshold level of the inverter 10, and the sensitivity of the photodiode 12.

Referring to FIG. 5, the radiation sensitive control element 60 in the preferred embodiment circuit 30, goes through the following states:

STATE A: During the low state of the signal RESET the radiation sensitive control element 60 is idle with the control signal being low, STATE B: Upon the raising edge of the signal RESET the radiation sensitive control element 60 is active, and the photodiode 12 is allowed to integrate the incident radiation;

STATE C: Upon the latching of the radiation sensitive control element 60, the control signal goes high; the radiation sensitive control element 60 remains idle until the arrival of another negative pulse in the signal RESET.

During the STATE A and B, the low level of the control signal holds the complementary switch Q5 of the T/H circuit in the memory 70 closed; therefore, the T/H circuit tracks the signal supplied to the memory input wire 34. The low level of the control signal also holds the switch Q6 of the signal generator 80 open; therefore, no current is supplied to the output signal wire 32.

In STATE C, the high level of the control signal opens the complementary switch Q5 of T/H circuit in the memory 70; therefore, T/H circuit holds, remembers or memorizes the level of the signal supplied to the memory input wire 34 precisely at the low-to-high transition of the control signal. This memorized signal is available for a readout on the memory output wire 35 during the STATE C. Therefore, the input radiation level is mapped into the output voltage level according to the shape of a waveform supplied to the memory input wire. The input radiation level may represent the magnitude of an input operand. By intelligently shaping the waveform supplied to the memory input wire 34, an operation or function is defined which maps the input operand into an output result.

Also, during STATE C the high control signal opens the switch Q6 and the current of the current source 26 is supplied to the output signal wire 32. Therefore, presence of the current in the output signal wire 32 signals that the inverter 10 has latched and that the T/H circuit in the memory 70 has memorized its data.

Figure 3:
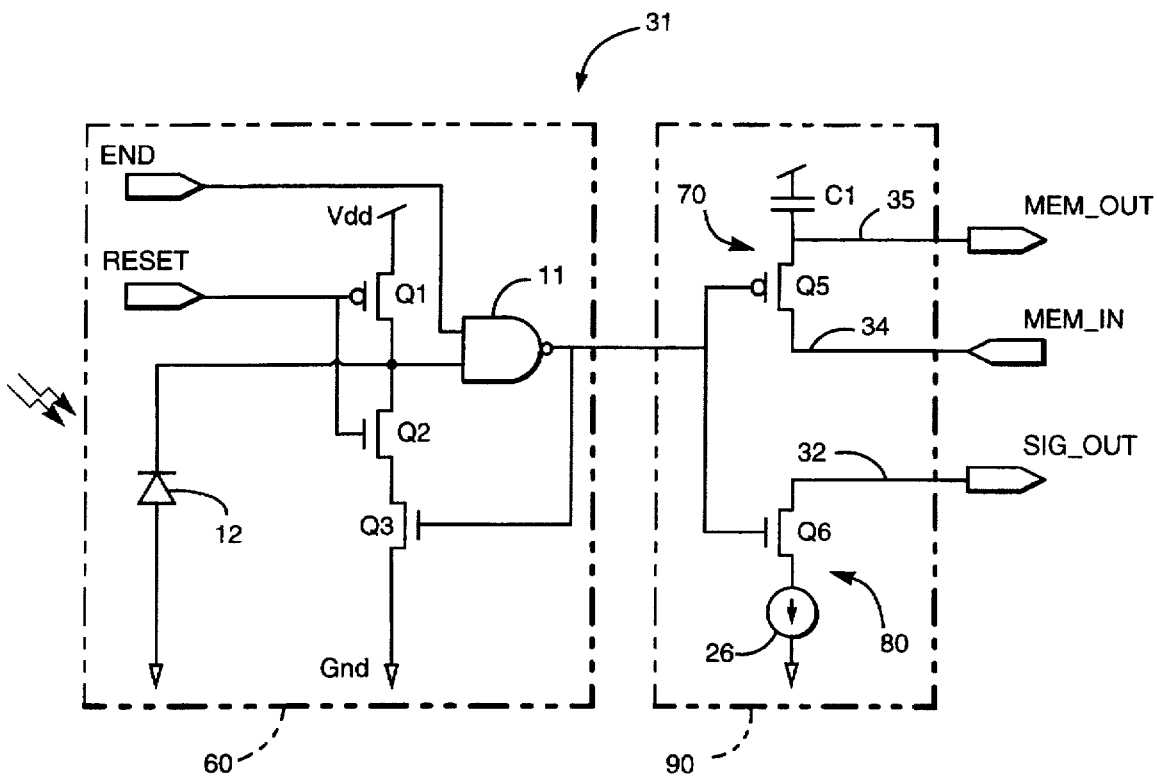
FIG. 3 shows a circuit diagram of another preferred embodiment of the present invention.

FIG. 3 shows a circuit 31, which is one ramification of the preferred embodiment of the circuit 100. The circuit 31 is identical to the circuit 30 in FIG. 2 except for the inverter 10 which is replaced with a two-input NAND gate 11. One input of the NAND gate 11 and the output have the same connections as the input and output of the inverter 10 respectively. The second input of the NAND gate 11 receives an additional signal END. In cases when low-level radiation is being received by the photodiode 12, long integration times are needed before the sensor signal can cause the inverter 10 in the radiation sensitive control element 60 to latch. Therefore, it is sometimes convenient to impose predetermined time-out or limit on duration of STATE B. This is achieved by introducing the NAND gate 11 and the signal END. While the signal END is held high, the operation of the circuit 31 is identical to the circuit 30. However, as soon as the signal END goes low, the radiation sensitive control element 60 is forced to latch and enter STATE C. This is a way to override the sensor signal in order to externally control the instant of the low-to-high transition in the control signal and, therefore, the function of the local processor 90. In this embodiment, the signal END has effect only if the radiation sensitive control element 60 has not been latched at the time of applying the low level portion of the signal END. If the radiation sensitive control element 60 has been latched (due to the sensor signal), then the signal END has no effect.

Figure 6:
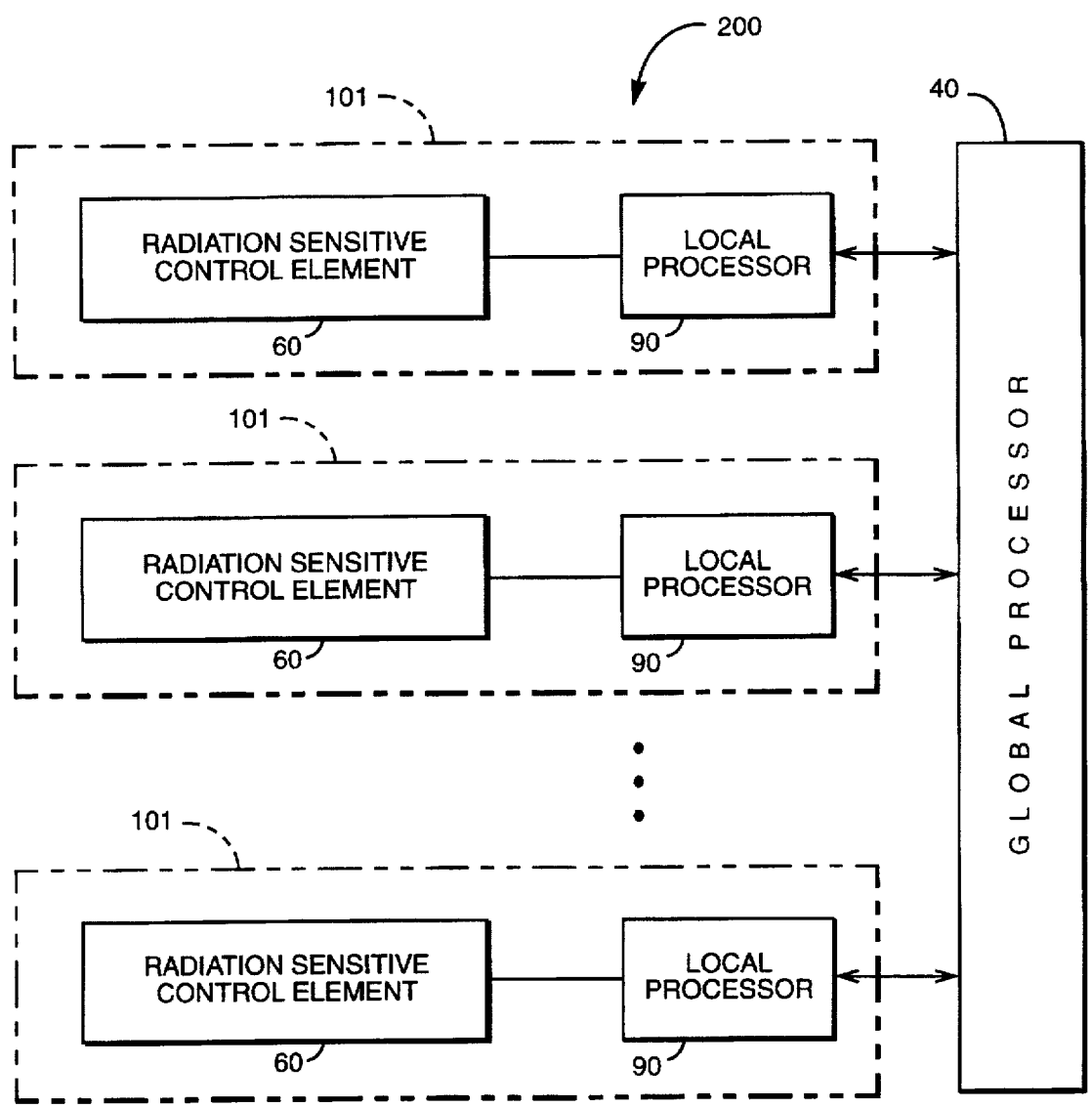
FIG. 6 shows a more complete structure of the present invention with plurality of cells.

In a more complete embodiment of present invention, shown in FIG. 6, a circuit 200 is comprised of a plurality of cells 101. The circuit 200 also includes a global processor 40. A variety of signals including those present on the wires of the plurality of the cells 101 can be communicated to the global processor 40. The global processor 40 may interconnect the cells 101. The global processor 40 may process the received signals to generate output data. The global processor 40 may also generate a data stream for supplying various wires of the plurality of the cells 101. The generated data stream may be at least one analog waveform. The generated data stream may also be at least one digital waveform. The processor 40 may be programmable.

Each cell 101 is comprised of a radiation sensitive control element 60 and a local processor 90. The radiation sensitive control element 60 generates a control signal or portion thereof at an instant determined by the radiation received. Any two cells 101 receiving different levels of radiation generate control signals at different instants. The local processor 90 has at least one predetermined function. The local processor 90 receives the control signal from the radiation sensitive control element 60. The control signal determines instants when the local processor 90 performs its function. If the local processor 90 is capable of performing plurality of functions, then the control signal may determine instants when the local processor 90 switches between its functions. Two cells 101 receiving different levels of radiation initiate functions of their local processors 90 at different instants. Each cell 101 is essentially the circuit 100 as shown in FIG. 1.

Depending on the function of the global processor 40 or portions thereof, various modes of operation of the circuit 200 are feasible. In one preferred embodiment of the circuit 200 shown in FIG. 7, each cell 101 is the circuit 30 of FIG. 2 (or the circuit 31 of FIG. 3, not shown). Through the global processor 40, the plurality of the cells 30 share several common wires: the output signal wires 32 from the plurality of cells 30 are connected to a common output signal wire 33; the memory input wires 34 in the plurality of cells 30 are connected to a common memory input wire 36; the plurality of cells 30 can be reset by the same signal RESET, and can be controlled by the same signal END (the circuit 31, not shown).

Figure 7:
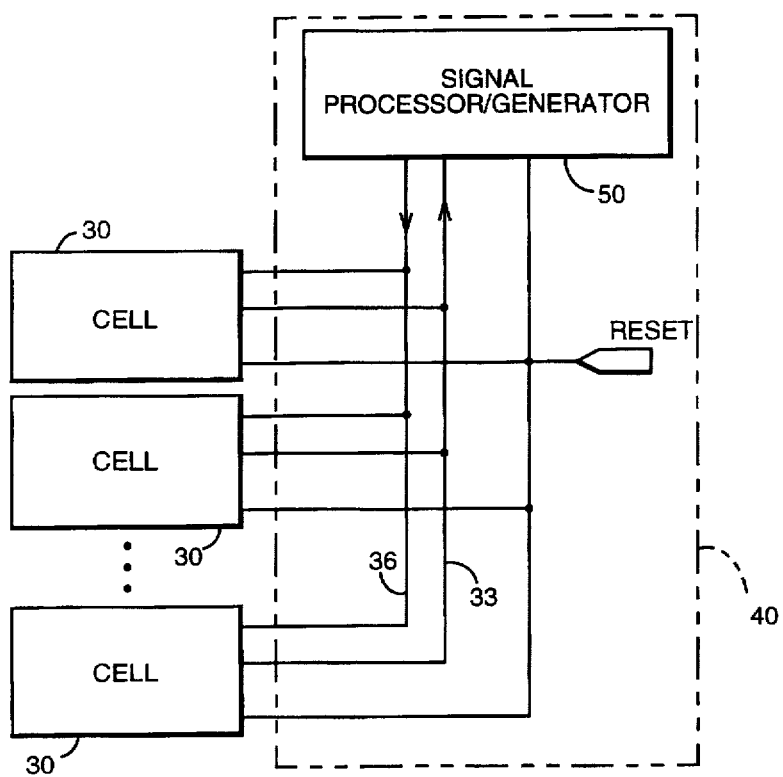
FIG. 7 shows the circuit of FIG. 6 using the plurality of circuits shown in FIG. 2.

The global processor 40 in FIG. 7 also includes a signal processor/generator 50. The signal processor/generator 50 can be connected to the common memory input wire 36 for generating and supplying a voltage waveform. The capacitor C1 in the one cell 30 follows this voltage waveform until the control signal in the one cell 30 disconnects the capacitor C1 from the common memory input wire 36. At that point the capacitor C1 in the one cell 30 retains the voltage or electric charge for later access and readout. The signal processor/generator 50 may also receive and process signal from the common output wire 33.

By virtue of interconnecting individual cells, the global processor 40 could carry out some computation. For example, in the embodiment of FIG. 7 the currents from output signal wires 32 of plurality of cells 30 are summed by simply connecting together the output signal wires 32. Therefore, in the embodiment of FIG. 7, a wire in combination with the signal generators 80 in all the cells 30 is the global processor performing a summing function.

Figure 8:
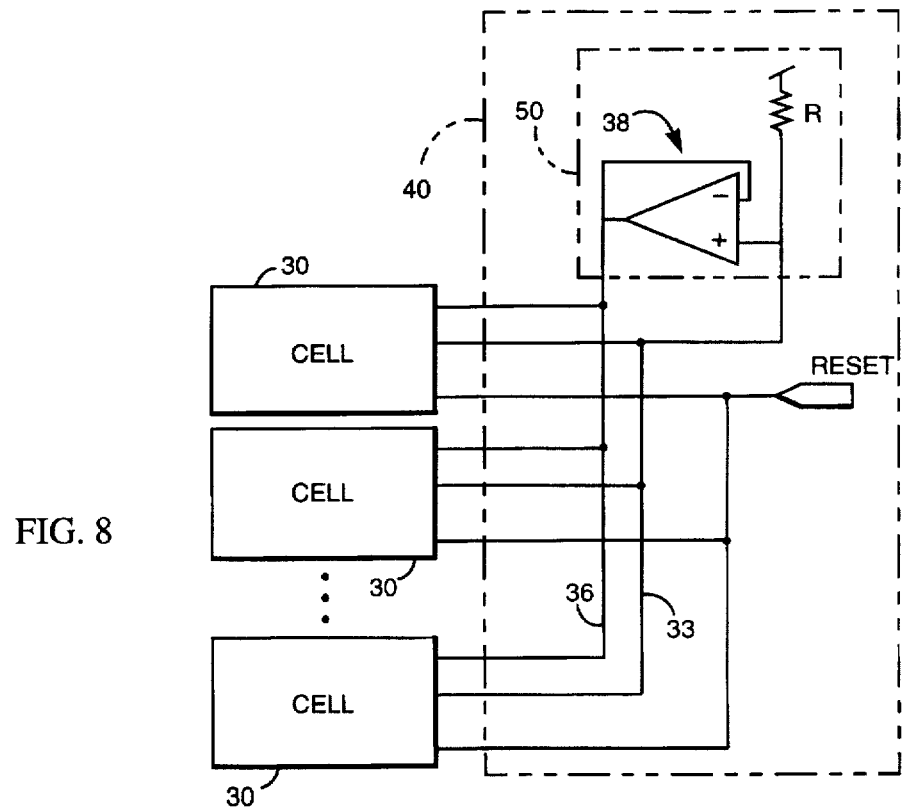
FIG. 8 shows one form and mode of operation of the arrangement in FIG. 7.

In one embodiment and a mode of operation, as shown in FIG. 8, the signal processor/generator 50 is wired (i.e. programmed) to include a resistor R. The signal processor/generator 50 may also include a voltage follower 38. The resistor R is connected between the power rail Vdd and the common output signal wire 33. The resistor R converts the current from the common output signal wire 33 into a voltage. The voltage follower 38 supplies this voltage to the common memory input wire 36 for storage in the memories of the cells 30.

The circuit shown in FIG. 8 performs sorting operation. The task of sorting is to organize or sort a set of input operands in ascending or descending order of their magnitudes; that is, given a set of input operands, sorting operation assigns to each input operand an ordinal number or index. Sorting is, in fact, one of the fundamental global non-linear operations on data and in image processing. It is the basis for histogramming, histogram equalization, non-linear filtering, such as median, MIN, and MAX filtering, etc.

To understand the theory of operation of the sorting mode, consider an input image that is sensed and thresholded by a global threshold. Output of the thresholding circuit is labeled 1 if the pixel value is below a global threshold, and 0 if it is above. The outputs of the thresholders are summed up by a global summer producing the total count of the cells labeled 1. Now suppose that instead of a constant threshold, the global threshold level increases in time. When the threshold becomes equal to the value of the input pixel, the output of the thresholding circuit in the cell turns on from 0 to 1. Assume that K pixels have been already turned on by then. This count K is being reported by the global summer and is, therefore, the index of the pixel that has just turned on. The value K (i.e. the index of the cell under consideration) can be saved within the cell for later readout. The global summer now has value K+1, and the process continues. If there are M cells with equal input values that are about to turn on when K cells have already been labeled 1, the idea presented above still works. All of those M cells are given an index K. Once these cells are on, there are K+M pixels which are labeled 1, and a next pixel that turns on is assigned index of K+M.

Figure 9:
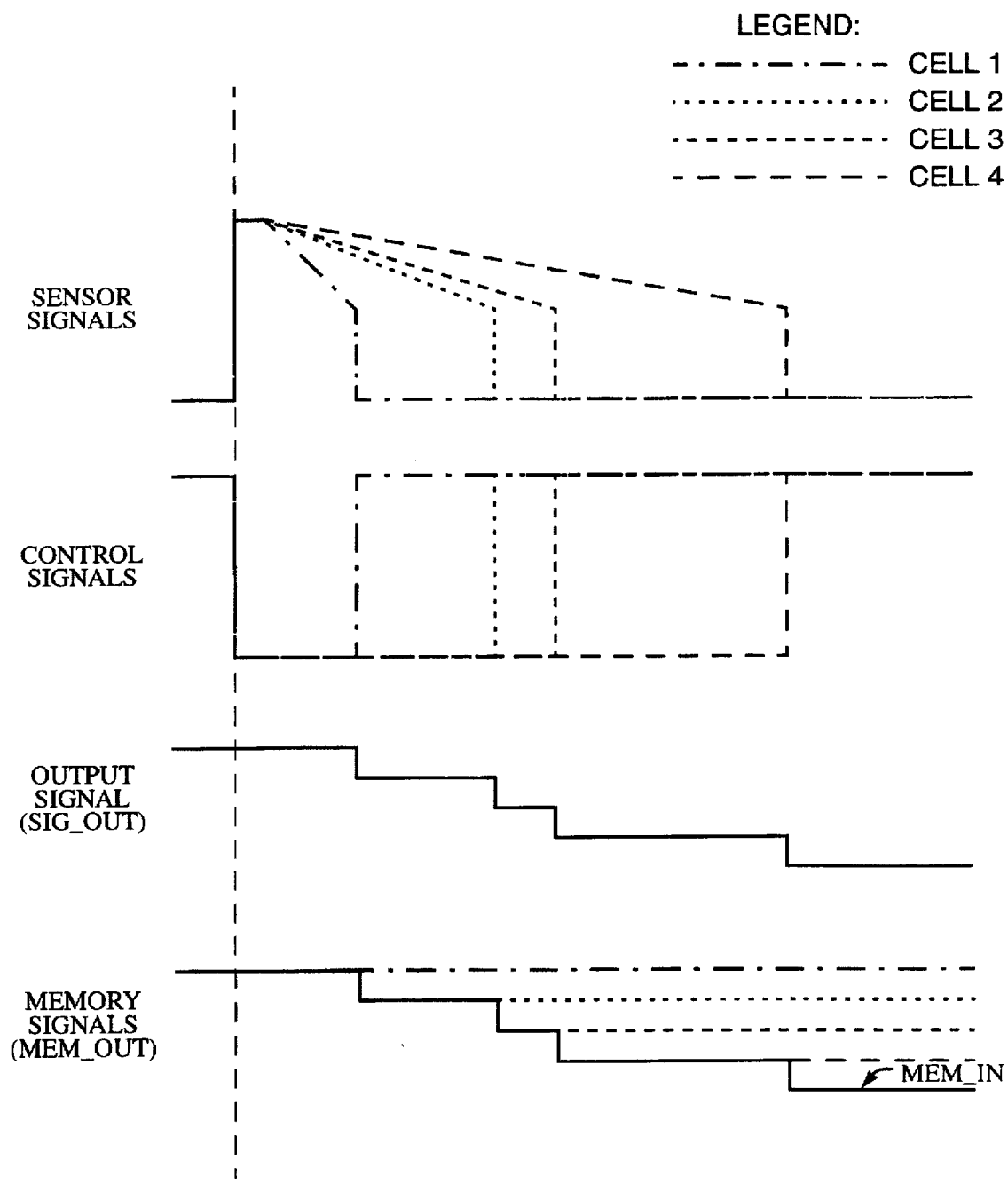
FIG. 9 shows signal waveforms typical for the operation of the circuit in FIG. 8.

Somewhat modified this concept is implemented by the circuit shown in FIG. 8. The appropriate signal waveforms of this circuit with four cells are graphed in FIG. 9. The sensor signals correspond to arbitrary level of received radiation, but are typical for the operation. The inverter 10 in the radiation sensitive control element 60 works as the thresholder. It monitors the sensor signal (FIG. 9, top graph) on the photodiode 12, and produces the control signal (FIG. 9, second graph). The common output wire 33 functions as the summer: currents on the output signal wires 32 in each cell 30 are summed up on the common output signal wire 33. The resistor R converts the total current in the wire 33 to a voltage. If the current source 26 of all the cells 30 generate same amount of current, the voltage on the common output signal wire 33 (FIG. 9, third graph) represents the index of a cell that is changing from STATE B to STATE C. The voltage on the wire 33 (i.e. index) is supplied to the common memory input wire 36 via the voltage follower 38. The capacitor $C_1$ within each cell 30 follows this voltage until it is disconnected, at which point the capacitor $C_1$ retains the index of the cell (FIG. 9, bottom graph), and is available for access and readout during the idle STATE C. From the bottom graph in FIG. 9 it is seen that the cell with the highest intensity input has received the highest "index", the next cell one "index" lower, and so on.

A readout circuit (not shown in FIG. 8) may employ various know techniques. In one case the readout circuit may comprise of a readout wire and a sensing amplifier connected to it. During the idle STATE C only one of the cells 30, or more specifically one memory output wire 35 thereof, is connected to the readout wire at the time. This connection may be achieved via one or more addressing switches. The addressing switches can be switched on and off by appropriate addressing means such as a digital decoder; therefore, one cell at the time, a portion of the signal charge stored within the addressed T/H circuit is brought to the sensing amplifier for detection.

Figure 4:
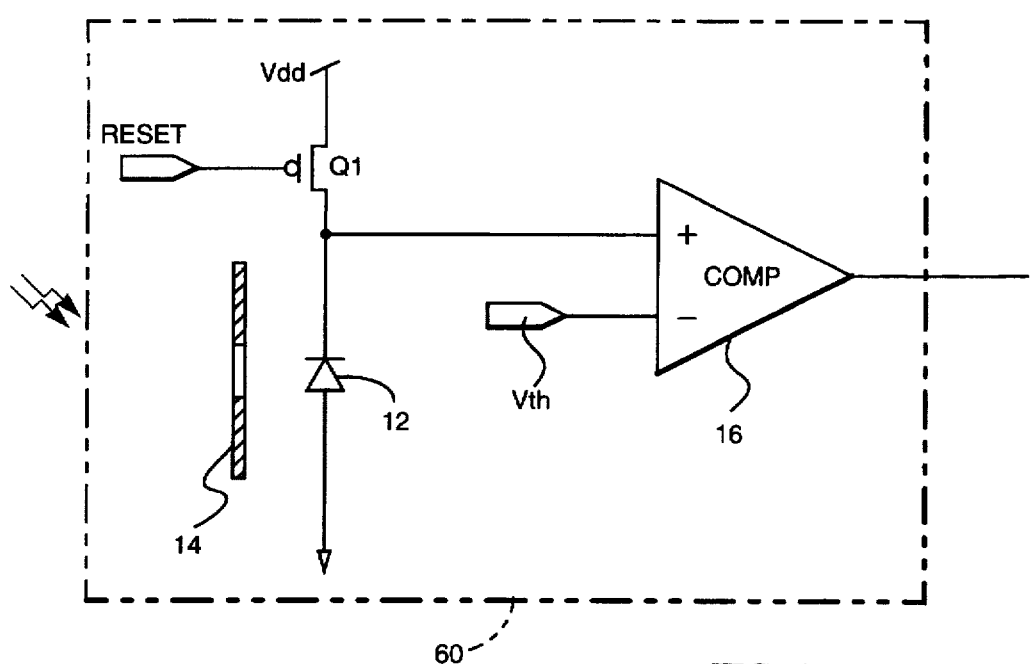
FIG. 4 shows another realization of the radiation sensitive control element.

Another embodiment of the radiation sensitive control element 60, shown in FIG. 4, enables present invention to directly implement the above described theory of operation for sorting. It includes a photodiode 12 and a comparator 16. In this embodiment, the photodiode 12 produces a sensor signal by sampling or measuring instantaneous incident radiation and holding this measurement. The sampling of radiation is facilitated by a shutter 14 which allows radiation to the photodiode 12 for limited period of time. The comparator 16 receives the sensor signal form the photodiode 12 and compares it with a threshold voltage Vth. The comparator 16 produces a control signal at instants when the level of the threshold voltage Vth is approximately equal to the level of the sensor signal from the photodiode 12.

The operation of the control element 60 as realized in FIG. 4 is as follows. At the beginning of a computation cycle the photodiode is reset to the voltage Vdd and left to float by the means of switch Q1 and a signal RESET. Then, the shutter 14 allows radiation to impinge upon the photodiode for a predetermined sampling period and then closes. At the end of the sampling period the voltage on the photodiode 12 has dropped proportionally to the radiant energy received during the sampling period. Then, the threshold voltage Vth to the comparator 16 is preferably monotonically swept from the voltage Vdd to zero volts. The control signal at the output of the comparator 16 is produced at the instant when the threshold voltage Vth reaches the level of the sensor signal on the photodiode 12. If the threshold voltage is varied linearly, then the instant when the control signal is produced is directly proportional to the sampled radiation.

There are many other modes of operation for the preferred embodiment shown in FIG. 7. These modes can be programmed by varying functionality of the signal processor/generator 40. The plurality of the cells 30 could be physically arranged in a two-dimensional array for use in imaging, i.e an image could be focused and sensed thereon. A few pieces of important information are calculated by the circuit shown in FIG. 7. First, the instant when the radiation sensitive control element 60 in each cell 30 latches is functionally related to the received radiation; more specifically, it is inversely proportional to the received radiation; second, at each given time the signal on the global output signal wire 33 indicates how many cells are latched.

Since time is functionally related to the input intensity, the signal waveform on the common output signal wire 33 is a temporal representation of a cumulative histogram of the input image. As defined by Ballard and Brown (included by reference, Section 3.2.2 of "Computer Vision", Prentice-Hall, 1982) a histogram of an image is a function of pixel intensity value p. The value of the histogram at a particular pixel intensity level p, denoted h(p), is the density or number of pixels in the image with that intensity value. The cumulative histogram is integral of the image histogram and represents how many pixels are below (or above) particular intensity level p. The cumulative histogram computed by the circuit 200 in its preferred embodiment shown in FIG. 7 can be used by the signal processor/generator 50 in many different ways. For example, differentiating the cumulative histogram signal produces the histogram of an image.

Referring to FIG. 7, the values that ought to be stored in the capacitors C1 of each cell 30 are supplied by the signal processor/generator 50 to the common memory input wire 36. The shape of signal waveform supplied defines mapping from received radiation intensities to intensities stored in the capacitors C1. Therefore, one way of programming the system and defining its functions is achieved by controlling the shape of this waveform. There are several useful examples:

Linear Imaging—When the waveform supplied to the common memory input wire 36 is inversely proportional to time, then the values stored in the capacitors C1 are proportional to the input intensity. This is a linear camera.

Non-saturating Imaging—When the signal processor/generator 50 is programmed to supply to the common memory input wire 36 a waveform which is negative linear ramp, i.e.

$$I_c(t) = -at + b$$

where a and b are constants, then the values stored in the capacitors C1 are:

$$I_c(t_{latch}) = -\frac{ak_1}{R_{hv}} + b$$

Therefore, for large radiation received the signal readout can never exceed b. This is convenient way of preventing saturation when receiving radiation of large dynamic range.

Histogram Equalization—One very useful image transformation which uses histrogram information is called histogram equalization (included by reference to Section 3.2.2 of Ballard and Brown, "Computer Vision", Prentice-Hall, 1982) Histogram equalization defines a mapping of pixel intensity levels p into new intensities q, such that the distribution or histogram of the intensity levels q is uniform. It turns out that the function which appropriately maps values p into q is the image cumulative histogram function. Therefore, when the voltage of the cumulative histogram (computed by the circuit itself on the wire 33) is supplied to the common input wire 36, the image which is generated is a histogram equalized version of the sensed image. This is essentially the sorting mode of operation and is achieved with the circuit shown in FIG. 8.

Region Segmentation—The histogram of an image (derived from the computed cumulative histogram) could be used to segment an image into regions. Pixels from a single region often have pixels of similar intensity that appear as clusters in the image histogram (described in and included by reference to Section 5.3 of Ballard and Brown, "Computer Vision", Prentice-Hall, 1982). The voltage to be stored in the capacitor could then be generated to correspond to a "label" of each such region. This could be done by programming the signal processor/generator 50 to update (i.e. increment by predetermined amount) the voltage level on the global memory input wire 36 when the transition between the clusters in the image histogram is detected. The image computed and stored in the plurality of cells is, therefore, image segmented into labeled regions.

Scene Change Detection—Using the change in the histogram pattern between frames is a basic technique to detect a scene change. The present invention computes cumulative histogram in real-time and can be used for low-latency scene discrimination/surveillance with no need for image readout.

Adaptive Dynamic Range Imaging—In many applications, for example, the illumination of the scene which is directly exposed to the sunlight is several hundreds times greater than the illumination for the surfaces in a shadow. During a single frame, both high and low intensity pixels can be mapped to the same output range. This is possible because the cells detecting high intensities "memorize" the supplied input voltage, before the low intensity cells. The signal processor/generator 50 can be, for example, programmed to supply to the memory input wire two negative linear ramps one after the other within a single frame. Both ramps would have same constant b (and generally different slope a). The point of time when the ramps are interchanged can be adjusted manually for best imaging, or the cumulative histogram can be used to determine this instant automatically.

In general one may program the signal processor/generator 50 to generate other waveforms and therefore define other mappings such as gamma correction, gain and offset adjustment, etc.

Important property of the present invention is: a) the analog sensor signal is mapped into the output data, b) the mapping takes place before image is readout of the sensor. These are fundamental advantages over the conventional imaging systems. For example, in conventional imagers the sensor signals are first readout, and usually quantized and digitized. Therefore, the data transfer time is added to the total processing time; and, all the variations of received radiation falling within a single quantization level are lost and can be only mapped into a single output value.

The prototype of present invention has been fabricated as a monolitic integrated circuit with 16 cells built in generic 2μ CMOS technology. In this prototype, the cell size is less then 100μ square. When fabricated in process with smaller feature size (e.g. 1.2μ, 0.8μ, etc.) or in more advanced and specialized process the cell size reduces (e.g. about 60μ, 40μ, and smaller). This allows integration of high resolution imaging arrays in standard planar integrated circuit technology.

While the above description contains many specificities, the reader should not construe these as limitations on the scope of the invention, but merely as exemplifications of preferred embodiments thereof. Those skilled in the art will now as the result of the teaching herein, perceive various modifications and additions which may be made to the invention. For example, they may devise implementations of the present invention in other then integrated circuit while still preserving features of the invention. They also may think of embodiments with various spatial arrangements of the sensor/processor cells. Those skilled in art may devise different embodiments of the local processors 90 within each cell. For example, if particular application does not require imaging one may drop the memory 70 from the local processor 90, and keep only signal generator 80 for image histogram computation. Conversely, if the histogram information is not needed, the signal generator 80 may be omitted. In some cases the memory 70 may be implemented by digital means. If so, the signal processor/generator 50 in FIG. 7 supplies a digital stream of data for memorizing within the memory 70.

The radiation sensitive control element 60 may be designed in many different ways. In general, the control signal can be any signal having time-discrete components; pulse is only one such example, sinusoidal burst is another. Further, the sensor does not have to operate in flux-integrating mode like in FIGS. 2, 3, 4. It even does not have to sample the received radiation as in FIG. 4. The sensor may provide continuous instantaneous measurement of the received radiation. Then the control signal may be fired at instants determined by this continuous instantaneous measurement of the received radiation. If the radiation is steady, the sampling is not necessary and the method used in the circuit of FIG. 4 can be employed to generate the control signal. However, if the radiation is changing during the computation cycle, some operations may not perform correctly and sampling may be necessary.

It is obvious now that the present invention has many useful practical applications and that in the future may find many other uses. The circuit 200 in its sorting configuration sorts values which are supplied as an image. Therefore, using a visualization device an array of numbers can be supplied to the circuit 200 optically. For example, consider a 512 by 512 image. The present invention could sort the image intensities at less than 30 frames per second. Furthermore, the sorting frame rate remains unchanged as the array size increases. Derived from findings included here by reference to Blelloch et al., "A Comparison of Sorting Algorithms for the Connection Machine CM-2", SPAA, 1991, the best performing sorting algorithm on a multimillion dollar 32K Connection Machine CM-2 can perform the job at about 5 frames per second. This rate is smaller for larger images. While it may be argued that the digital computer is less susceptible to noise and performs sorting more accurately, the speed, cost, size and power consumption benefits of the present invention may very well outweigh possible lack of perfect accuracy. If required, number sequences ordered by the present invention can be an excellent starting point for more rigorous sorting on a digital computer. The best performing sorting algorithms for a digital computer are those which use statistical properties of an initial sequence distribution. By preprocessing data using the present invention such sorting algorithms would perform optimally every time.

When the VLSI technology allows 3D structures, the results of the computations of the present invention can be converted from electrical to optical signals. This way present invention becomes a versatile non-linear processor in an optical processing system. The future technology may also provide a practical way of providing large groups of data to the present invention by other than the means of radiation.

What is claimed is:

1. A method for parallel data computation, comprising the steps of:

introducing a plurality of input operands incident upon a first area having a plurality of cells, each of said cells receiving one input operand, and having only two states;

simultaneously resetting all the cells to a first active state in response to a reset event;

generating an event with a control means in each of said cells at an instant each of said cells transitions from said first active state to a second idle state, the duration of said first active state determined by said control means substantially as a monotonic function of the magnitude of the input operand received by the cell, wherein any two cells in said plurality of cells receiving the input operands of different magnitudes produce said events at different times;

performing at least one operation with a local processing means associated with each of the cells in response to said event generated within the associated cell, the one operation initiated substantially at the time the associated cell generates said event;

communicating at least one signal from each of the cells to a global processing means, the signal communicated substantially at the instant said event occurs in the cell, thereby indicating to the global processing means the magnitude of the input operand received by the signaling cell; and performing at least one function with said global processing means in response to the received signals substantially at the instant each signal is received, wherein at least one temporal representation describes the plurality of input operands.

2. The method of claim 1 wherein the step of performing at least one operation with said local processing means includes the operation of storing the instantaneous value of said temporal representation, the storing performed substantially at the instant the associated one cell generates said event.

3. The method of claim 2 wherein the step of performing at least one function with said global processing means includes performing a counting function for continuously reporting a count of the cells which are simultaneously in one of said first active state and said second idle state.

4. The method of claim 3 further comprising the step of simultaneously placing all the cells in said second idle state, with an overriding means responsive to an overriding event, substantially at the instant said overriding event occurs.

5. The method as recited in claim 4 further comprising the step of simultaneously placing all of said cells in said second idle state, with an overriding means responsive to an overriding event, substantially at the instant said overriding event occurs.

6. A method for low latency global characterization of a plurality of input operands, comprising the steps of:

introducing a plurality of input operands incident upon a first area having a plurality of cells, one of said cells receiving one of said input operands, and having only two states;

simultaneously resetting all of said cells to a first active state in response to a reset event;

generating an event with a control means in each of said cells for signaling to the outside of the cell, said event generated at an instant the cell transitions from said first active state to a second idle state, the duration of said first active state determined by said control means substantially as a monotonic function of the magnitude of the input operand received by the cell, wherein any two cells in said plurality of cells receiving the input operands of different magnitudes produce said events at different times;

communicating said events to a global processing means, each of said events communicated substantially at the instant said event is generated; and continuously producing, with said global processing means, a count of the cells which are simultaneously in one of said first active state and said second idle state, said count updated by said global processing means in response to each of said events substantially at the instant each of said events is received, said count temporally representing a cumulative histogram of said plurality of input operands.

7. The method as recited in claim 6 further comprising the step of storing the instantaneous value of said count within a memory means associated with each of said cells, the storing performed substantially at the instant each of said cells generates said event.

8. A method for sorting a plurality of input operands, each operand being a real number, wherein one index or pointer from an ordered list is assigned to at least one input operand in such a way that the order of the indices reflects the order of magnitudes of the input operands, comprising the steps of:

introducing said plurality of input operands incident upon a first area having a plurality of cells for receiving said input operands, each of said cells receiving one of said operands, and having only two states;

simultaneously resetting all of said cells to a first active state in response to a reset event;

generating an event, in each of said cells, for signaling to the outside of each of said cells, said event generated at an instant the cell transitions from said first active state to a second idle state, the duration of said first active state determined by the cell substantially as a monotonic function of the magnitude of the input operand received by the cell, wherein any two cells in said plurality of cells receiving the input operands of different magnitudes produce said events at different times;

continuously producing, with a global processing means, a count of the cells which are simultaneously in one of said first active state and said second idle state, said count updated by said global processing means in response to each of said events substantially at the instant each of said events is received; and storing the instantaneous value of said count within a memory means associated with each of said cells, the storing performed substantially at the instant the associated one cell generates said event, wherein the content of said memory means represents the index assigned to each of said input operands received by each of said cells.

9. A circuit for low latency computation over a plurality of input operands, comprising:

a plurality of cells for receiving said plurality of input operands, each of said cells receiving one input operand, and each cell having two states;

a reset means associated with said plurality of cells for simultaneously resetting all of the cells to a first active state in response to a reset event;

a control means, in each of said cells, for generating an event for signaling to the outside of the cell, said event generated at an instant the cell transitions from said first active state to a second idle state, the duration of said first active state determined by said control means substantially as a monotonic function of the magnitude of the input operand received by said cell, wherein any two cells from said plurality of cells receiving input operands of different magnitude produce said events at different times;

a global processing means, receiving said events generated by said plurality of cells, for continuously producing a count of said cells which are simultaneously in one of said first active state and said second idle state, said count updated by said global processing means in response to each of the received events substantially at the instant each of the events is received, wherein said count is a globally computed temporal representation of a cumulative histogram of the plurality of input operands.

10. The circuit of claim 9 wherein each of said cells comprises a sensing means for receiving said input operand represented as a radiant flux, said sensing means converting said radiant flux to a sensor signal determined as a time integral of said radiant flux; and said control means in each of said cells comprises a thresholding means for receiving said sensor signal and producing said event when a predetermined level of the integrating sensor signal is reached.

11. The circuit of claim 10 wherein said sensing means comprises a photodiode disposed on a surface for receiving said radiant flux, said photodiode operating in a flux integration mode and converting said radiant flux to a sensor signal, said mode controlled by said reset means wherein said photodiode is momentarily precharged to a predetermined inverse voltage and placed into said first active state in which said photodiode integrates said radiant flux and monotonically reduces said inverse voltage at a rate determined by the magnitude of said radiant flux; and said thresholding means comprises a digital inverter for producing a digital output signal having an edge representing said event generated by said control means, said edge produced when said sensor signal reaches a threshold of said inverter.

12. The circuit of claim 11 further comprising a positive feedback means for improving dynamic performance of said digital inverter and making said edge in said digital output signal transition faster.

13. The circuit of claim 9 wherein said control means in each of said cells comprise a sensing means for producing a sensor signal having a level corresponding to the radiant flux received by said sensing means; and a thresholding means receiving said sensor signal and having a monotonically sweeping threshold level responsive to a second signal, said thresholding means generating said event when the sweeping threshold level reaches the level of said sensor signal.

14. The circuit of claim 9 further comprising a memory means, associated with each of said cells, for storing the instantaneous value of said count substantially at the instant the associated one cell generates said event.

15. The circuit of claim 14 further comprising an overriding means responsive to an overriding event, for simultaneously overriding said control means in said cells by placing all of the cells into said second idle state substantially at the instant said overriding event occurs.

16. The circuit of claim 15 wherein each of said cells comprises a photodiode disposed on a surface for receiving said input operand represented as a radiant flux, said photodiode operating in a flux integration mode and converting said radiant flux to a sensor signal, said mode controlled by said reset means wherein said photodiode is first momentarily precharged to a predetermined inverse voltage and then placed into said first active state in which said photodiode integrates said radiant flux and monotonically reduces said inverse voltage at a rate determined by the magnitude of said radiant flux, and said control means in each of said cells comprises a digital gate having two inputs including a first input and a second input, said first input receiving said sensor signal and said second input receiving said overriding event, said digital gate producing a digital output signal having an edge representing said event generated by said control means, said edge produced when said sensor signal reaches a threshold at the first input before said overriding event occurs at the second input and said edge produced when said overriding event occurs at the second input before the sensory signal reaches said threshold of the first input.

17. The circuit of claim 16 wherein said digital gate further comprises a positive feedback means for improving its dynamic performance and for making said edge in said digital output signal transition faster.

* * * * *